(12) United States Patent  
Ryu et al.

(10) Patent No.: US 8,027,174 B2  
(45) Date of Patent: Sep. 27, 2011

(54) ADAPTER POWER SUPPLY

(75) Inventors: Byoung Woo Ryu, Suwon-si (KR); Gun Woo Moon, Daejeon-si (KR); Seong Wook Choi, Daejeon-si (KR); Jong Sun Kim, Suwon-si (KR); Dong Seong Oh, Incheon-si (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 436 days.

(21) Appl. No.: 12/246,971

(22) Filed: Oct. 7, 2008

(65) Prior Publication Data

US 2010/0020578 A1 Jan. 28, 2010

(30) Foreign Application Priority Data

Jul. 25, 2008 (KR) .................. 10-2008-0072705

(51) Int. Cl.
*H02M 3/335* (2006.01)
(52) U.S. Cl. .............. 363/16; 363/21.03; 363/21.07; 363/21.15; 363/35
(58) Field of Classification Search .......... 363/16, 363/17, 18, 20, 34, 35, 21.03, 21.07, 21.15
See application file for complete search history.

(56) References Cited

U.S. PATENT DOCUMENTS

| 5,870,294 | A | * | 2/1999 | Cyr ........................ 363/41 |
| 2006/0056210 | A1 | * | 3/2006 | Yamada et al. ................ 363/63 |
| 2008/0198638 | A1 | * | 8/2008 | Reinberger et al. ............ 363/74 |

FOREIGN PATENT DOCUMENTS

| JP | 2002-262562 A | 9/2002 |
| JP | 2002-315329 A | 10/2002 |

* cited by examiner

*Primary Examiner* — Adolf Berhane  
*Assistant Examiner* — Nguyen Tran  
(74) *Attorney, Agent, or Firm* — Lowe, Hauptman, Ham & Berner, LLP

(57) ABSTRACT

An advantage of the present invention is to provide an adapter power supply which varies a link voltage of DC power serving an input power of a DC/DC converter according to variation of a load current estimated by measuring a secondary current using a lossless current measurement technique at a primary terminal of a transformer of the DC/DC converter and thus presuming a load current of an output power.

An adapter power supply according to present invention may include an AC/DC converter converting a commercial AC power into a DC power; a DC/DC converter including a transformer composed of a primary terminal and a secondary terminal in order to output an output power by converting a link voltage of the DC power; and a controller presuming a load current of the output power through a primary current of the transformer and varying the link voltage of the DC power according to variation of the estimated load current.

7 Claims, 4 Drawing Sheets

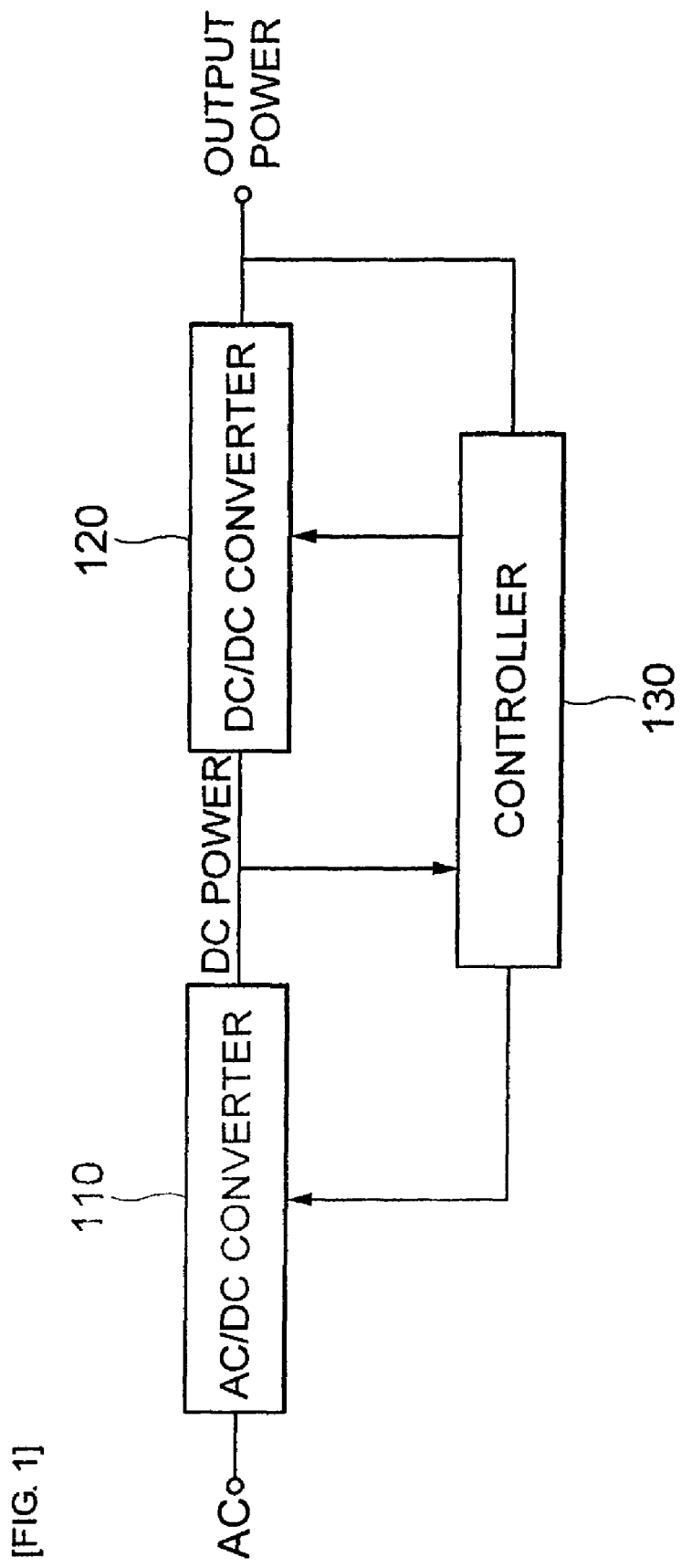
[FIG. 1]

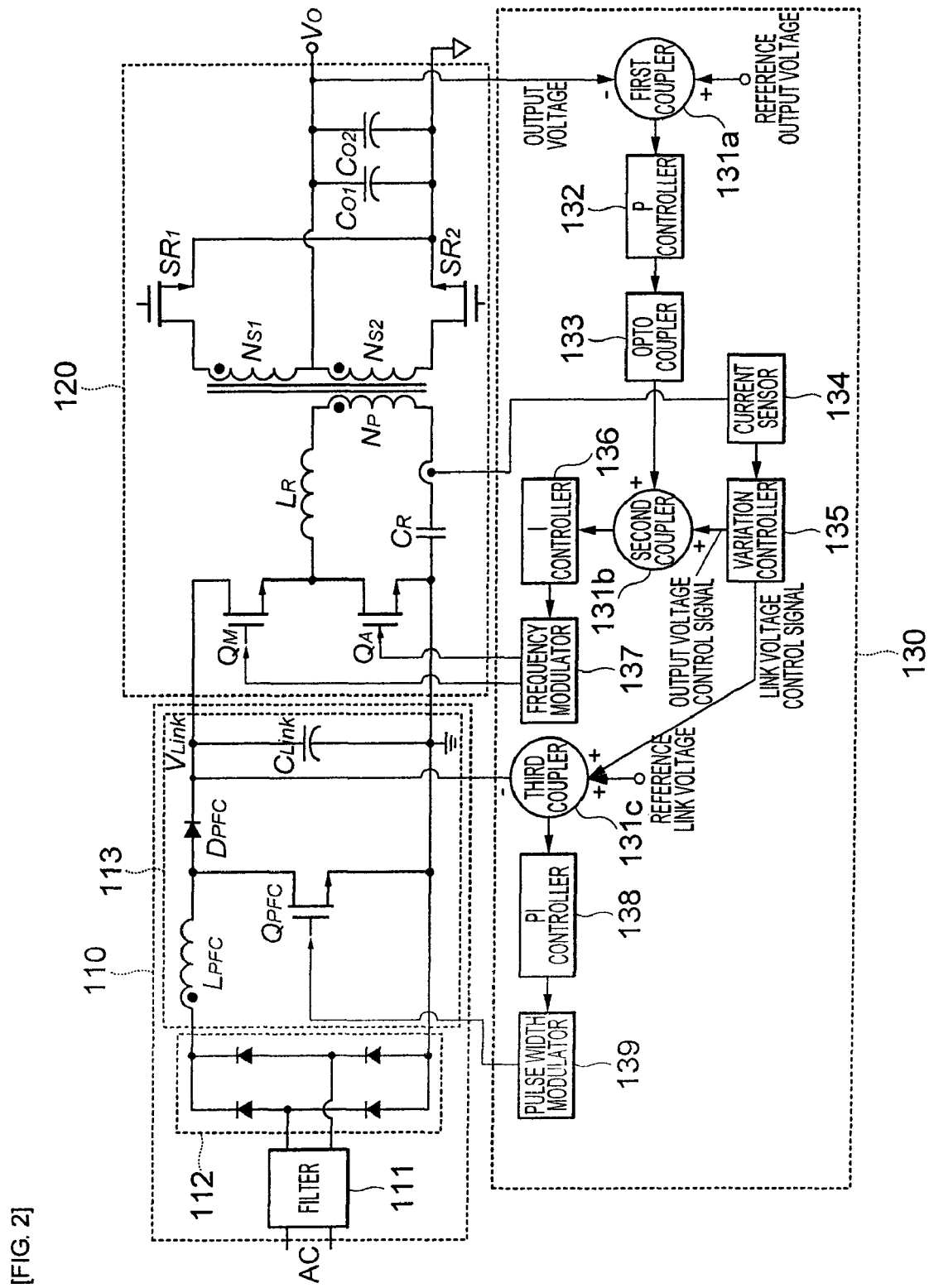
[FIG. 2]

[FIG. 3]
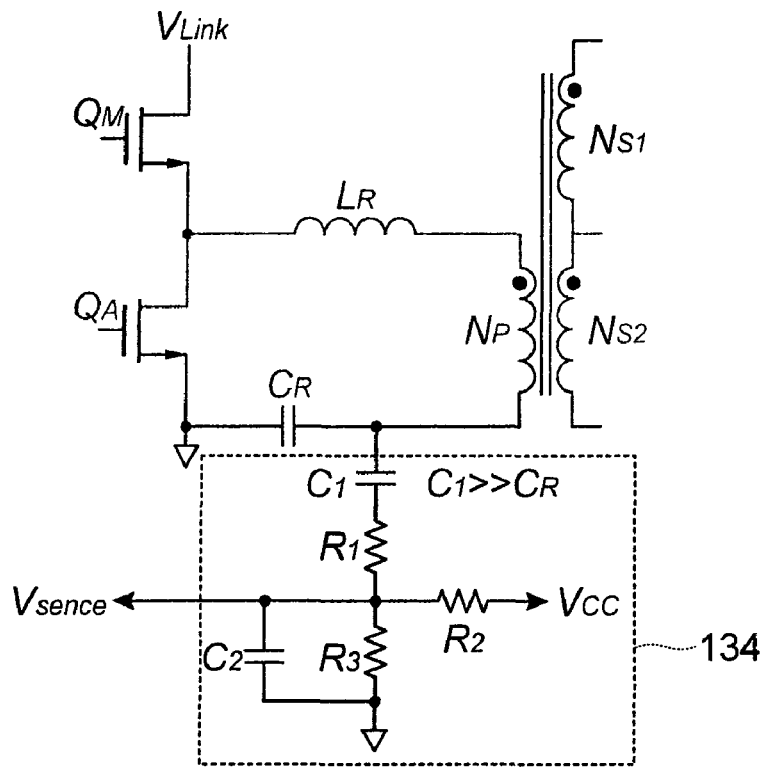
[FIG. 4]
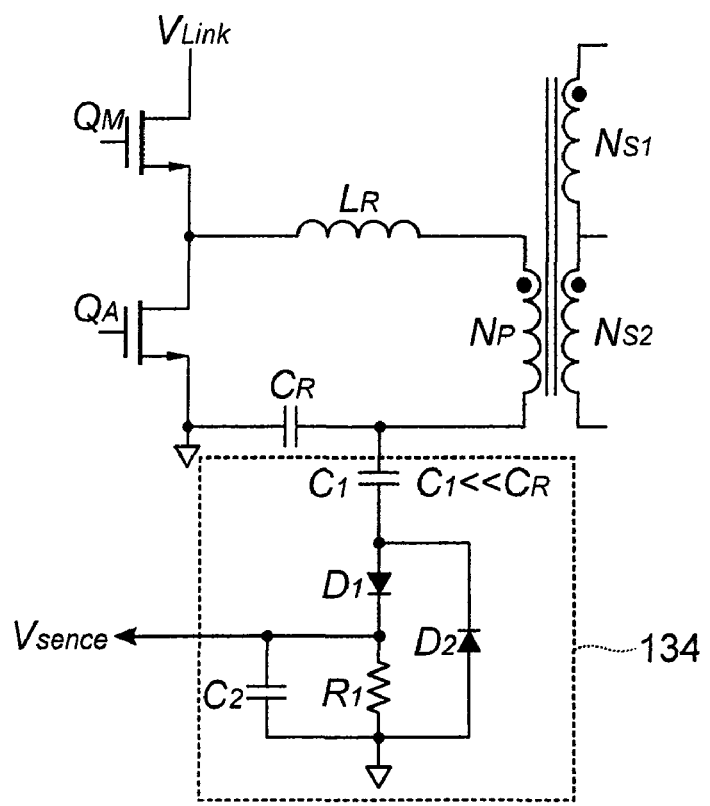

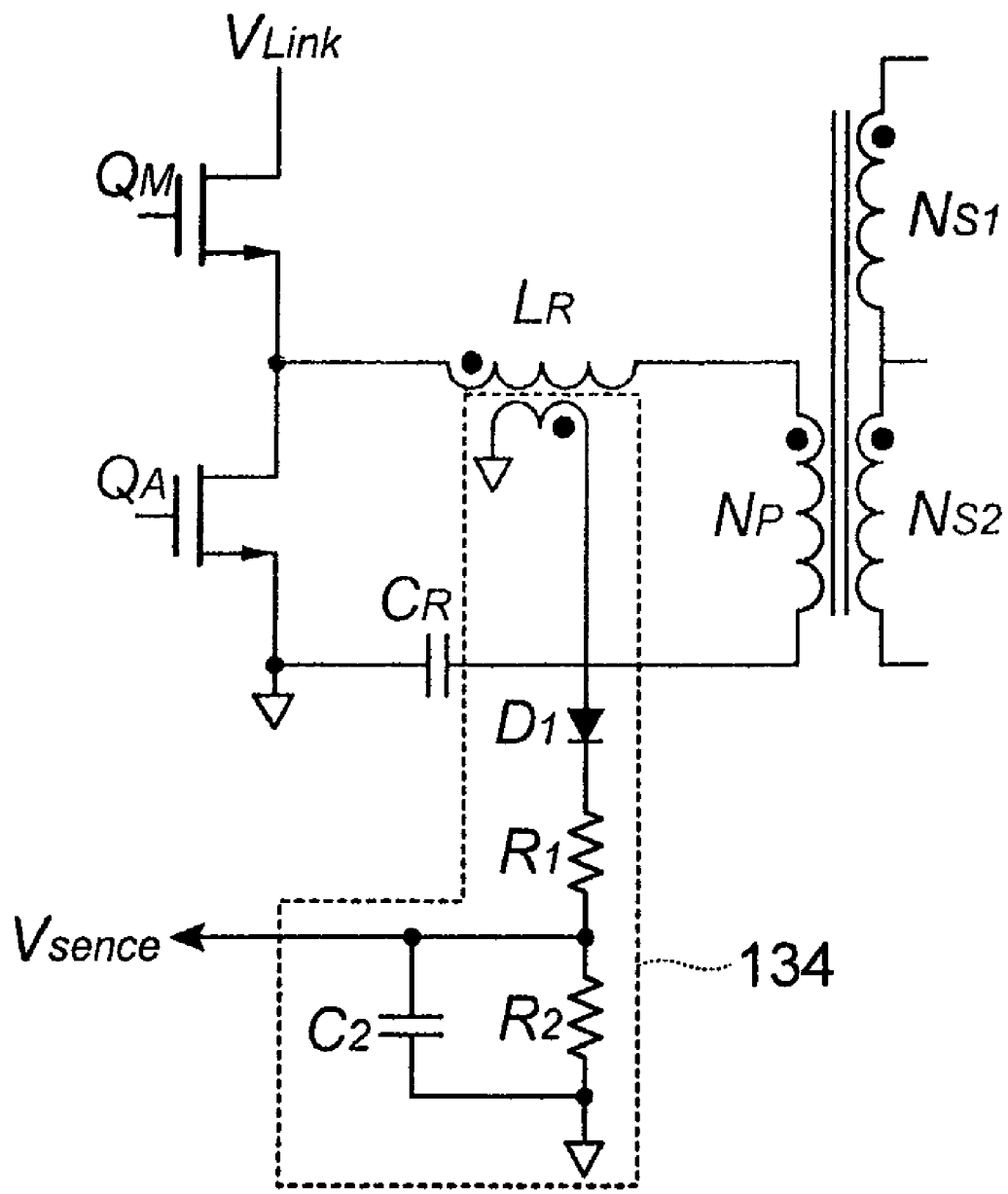
[FIG. 5]

ADAPTER POWER SUPPLY

CROSS-REFERENCE TO RELATED APPLICATIONS

This application claims the benefit of Korean Patent Application No. 10-2008-0072705 filed with the Korea Intellectual Property Office on Jul. 25, 2008, the disclosure of which is incorporated herein by reference.

BACKGROUND OF THE INVENTION

1. Field of the Invention

The present invention relates to an adapter power supply; and more particularly, to an adapter power supply estimating the load current of output power through the primary current of a transformer and varying the link voltage of DC power serving as an input power of a DC/DC converter according to variation of the estimated load current.

2. Description of the Related Art

An adapter power supply is widely used in electronic apparatuses such as a notebook PC, a display monitor, a cellular phone, and the like.

Generally, such an adapter power supply has a double-stage type structure consisting of an AC/DC converter taking exclusive charge of a power factor and harmonic restriction and a DC/DC converter capable of desired output voltage.

Unlike a characteristic of a general power supply in which an output voltage decreases as an output current increases, the adapter power supply is required to have a load characteristic in which the output voltage increases as the output current serving as the load current. For this, recently, there has been proposed a method of operating an LLC resonant converter in the vicinity of a resonant frequency at all times by varying an link voltage of a DC power serving as an input power of a DC/DC converter according to a load current by using a boost converter as an AC/DC converter and the LLC resonant converter as the DC/DC converter.

However, in the above-described method, since the load current was detected by inserting a resistor between a secondary output terminal of the transformer of the DC/DC converter and a load, power was lost due to a current measurement resistance. A link voltage variation signal generated from the current measurement resistance has to compensate for an error signal inputted into a gain/integral controller positioned a secondary terminal of the DC/DC converter and should control the link voltage by transmitting a signal even to a controller of the AC/DC converter, an additional Opto Coupler in addition to an Opto coupler for controlling an output voltage of the DC/DC converter have to be used. Such an added Opto coupler and an additional circuit for actuating the same an the like increase the volume of the adapter power supply, thereby making it difficult to manufacture a high-density adapter power supply.

SUMMARY OF THE INVENTION

An advantage of the present invention is that it provides an adapter power supply which varies a link voltage of DC power serving an input power of a DC/DC converter according to variation of a load current estimated by measuring a secondary current using a lossless current measurement technique at a primary terminal of a transformer of the DC/DC converter and thus presuming a load current of an output power.

According to an aspect of the present invention, an adapter power supply may include an AC/DC converter converting a commercial AC power into a DC power; a DC/DC converter including a transformer composed of a primary terminal and a secondary terminal in order to output an output power by converting a link voltage of the DC power; and a controller presuming a load current of the output power through a primary current of the transformer and varying the link voltage of the DC power according to variation of the estimated load current.

In the aspect of the present invention, the AC/DC converter may include a filter removing electro-magnetic interference of the commercial AC power; a rectifier rectifying and smoothing the AC power passing the filter; and a power factor compensator compensating for a power factor of the rectified power passing the rectifier and outputting the DC power.

In the aspect of the present invention, the DC/DC converter is an LLC (Logical Link Control) resonant converter.

In the aspect of the present invention, the controller may include a first coupler outputting a difference between an output voltage of the output power and a reference output voltage; a gain controller connected to the first coupler; an Opto coupler connected to the gain controller; a current sensor sensing the primary current of the transformer; a variation controller connected to the current sensor, and outputting an output voltage control signal and a link voltage control signal; a second coupler coupling a control signal passing the Opto coupler with the output voltage control signal outputted from the variation controller; an integral controller connected to the second coupler; a frequency modulator connected to the integral controller and controlling switching of the DC/DC converter; a third coupler coupling a difference of the link voltage of the DC power and a reference link voltage, and the link voltage control signal of the variation controller; a gain/integral controller connected to the third coupler; and a pulse width modulator connected to the gain/integral controller and controlling switching of the AC/DC converter.

In the aspect of the present invention, the current sensor senses the primary current of the transformer through voltage ripple measurement of a resonant capacitor in which a voltage is varied by integrating a current of a resonant inductor at the primary terminal of the transformer.

In the aspect of the present invention, the current sensor senses the primary current of the transformer by a current distributing method using a part of a current inputted into the resonant capacitor at the primary terminal of the transformer.

In the aspect of the present invention, the current sensor senses the primary current of the transformer by adding an auxiliary winding to the resonant inductor at the primary terminal of the transformer.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a diagram illustrating the schematic configuration of an adapter power supply according to an embodiment of the present invention;

FIG. 2 is a detailed circuit diagram of an adapter power supply according to the present invention;

FIG. 3 is a circuit diagram of a current sensor sensing a primary current of a transformer by a resonant capacitor voltage ripple measuring method;

FIG. 4 is a circuit diagram of a current sensor sensing a primary current of a transformer by a resonant capacitor current distributing method; and FIG. 5 is a circuit diagram of a current sensor sensing a primary current of a transformer by a resonant inductor auxiliary winding method.

DETAILED DESCRIPTION OF THE PREFERRED EMBODIMENTS

Hereinafter, an embodiment of the present invention will be described in detail with reference to the accompanying drawings. However, the present invention may be changed in various forms other than the embodiment. The scope of the present invention is not limitative to the embodiment to be described below. The embodiment of the present invention is provided to those skilled in the art in order to describe the present invention more completely. Accordingly, shapes and sizes of elements shown in the drawings may be exaggerated for more definite description, wherein like reference numerals refer to like elements throughout.

FIG. 1 is a diagram of the schematic configuration of an adapter power supply according to an embodiment of the present invention.

Referring to FIG. 1, the adapter power supply according to the embodiment of the present invention includes an AC/DC converter 110, a DC/DC converter 120, and a controller 130.

The AC/DC converter 110 switches a commercial AC power to convert it into a DC power. The DC/DC converter 120 switches the DC power to output an output voltage by converting a link voltage of the DC power. The controller 130 estimates a load current of the output power through a primary current of the DC/DC converter 120 and varies the link voltage of the DC power according to variation of the estimated load current.

Preferably, the AC/DC converter 110 may be a boost converter and the DC/DC converter (120) may be an LLC resonant converter.

FIG. 2 is a detailed circuit diagram of an adapter power supply according to an embodiment of the present invention.

Referring to FIG. 2, the adapter power supply according to the embodiment of the present invention may include the AC/DC converter 110, the DC/DC converter 120, and the controller 130.

The AC/DC converter 110 may include a filter 111 removing the Electro-Magnetic Interference (EMI) of the commercial AC power, a rectifier 112 rectifying and smoothing an AC power passing the filter 111, a power factor compensator 113 compensating for a power factor of the rectified power passing the rectifier 112.

The DC/DC converter 120 is the LLC resonant converter operating in the vicinity of a resonant frequency. The DC/DC converter 120 may include a transformer consisting of a primary terminal and a secondary terminal in order to convert the DC power into the output power.

The controller 130 may include a first coupler 131a outputting a difference between an output voltage of the output power and a reference output voltage, a gain controller 132 connected to the first coupler 131a, an Opto coupler 133 connected to the gain controller 132, a current sensor 134 sensing the primary current of the transformer, a variation controller 135 connected to the current sensor 134 to output an output voltage control signal and a link voltage control signal, a second coupler 131b coupling a control signal passing the Opto coupler 133 with the output voltage control signal outputted from the variation controller 135, an integral controller 136 connected to the second coupler 131b, a frequency modulator 137 connected to the integral controller 136 and controlling the switching of the DC/DC converter 120, a third coupler 131c coupling a difference between the link voltage of the DC power and a reference link voltage to the link voltage control signal of the variation controller 135, a gain/integral controller 138 connected to the third coupler 131c, and a pulse width modulator 139 connected to the gain/integral (PI) controller 138 and the switching of the AC/DC converter 110.

The controller 130 senses the primary current of the transformer and thus estimates the load current of the output power to vary the line voltage of the current power according to the estimated load current. Accordingly, when the load current of the output power increases, it is possible to satisfy a load characteristic in which the output voltage of the output power increases.

A method of presuming the load current of the output power by sensing the primary current of the transformer will be now described in more detail.

The DC/DC converter 120 according to the embodiment of the present invention is the LLC resonant converter. When the LLC resonant converter operates in the vicinity of the resonant frequency, a current of an output synchronization rectifier is configured by a difference between a primary resonant inductor current and a magnetization inductor current with respect to a half switching cycle. A load current is determined by averaging the difference. At this time, when a winding ratio of the transformer is estimated to 1:1, and the difference is determined by averaging each of the primary resonant inductor current and the magnetization inductor current, the following equation can be obtained.

$$i_0 = \langle i_{SDI}(t) \rangle = \langle i_{1s}(t) - i_{1sH}(t) \rangle = k(\langle i_{1,r}(t) \rangle - \langle i_{1,m}(t) \rangle) = k(\langle i_{1,r}(t) \rangle - 0) = k\langle i_{1,r}(t) \rangle \quad \text{Equation 1}$$

In the LLC resonant converter, since the magnetization inductance current has no offset, an average current is 0 and the output synchronization rectifier current is in proportion to an average value of the primary resonant inductor current by a predetermined constant, and also in proportion to the load current. Accordingly, it is possible to estimate the load current of the output power by measuring and averaging the resonant inductor current serving as the primary current of the transformer.

FIG. 3 is a circuit diagram of the current sensor sensing the primary current of the transformer by a resonant capacitor voltage ripple measuring method. FIG. 4 is a circuit diagram of the current sensor sensing the primary current of the transformer by a resonant capacitor current distributing method. FIG. 5 is a circuit diagram of the current sensor sensing the primary current of the transformer by a resonant inductor auxiliary winding method.

Referring to FIGS. 3 to 5, a lossless current measuring method in which an additional current measuring resistor for measuring a resonant inductor current serving as the primary current of the transformer will be described.

In FIG. 3, the primary current of the transformer is sensed through voltage ripple measurement of a resonant capacitor in which a voltage varies by integrating the resonant inductor current. In this case, the current sensor 134 may include two capacitors and three resistors.

In FIG. 4, the primary current of the transformer is sensed through a current distributing method using a part of a current inputted into the resonant capacitor. In this case, the current sensor 134 may include two capacitors, two diodes, and one resistor.

In FIG. 5, the inductor current serving as the primary current of the transformer is sensed by adding an auxiliary winding to the resonant inductor. In this case, the current sensor 134 may include one auxiliary winding, one diode, one capacitor, and two resistors.

Meanwhile, since the resonant capacitor voltage ripple measuring method shown in FIG. 3 has a phase later than the resonant capacitor current distributing method shown in FIG. 4 or the inductor current measuring method using the auxiliary winding shown in FIG. 5 by 90 degrees, the former and the latter may show a difference in response speed, but a low pass filter (composed of a capacitor and a resistor) used to reduce an influence of a 120 Hz ripple from the link voltage of the DC power may remove the difference, whereby the operation of all the circuits are the same as each other.

The present invention uses the lossless current measuring method at the primary terminal of the transformer without detecting the load current by inserting the resistor between the secondary output terminal of the transformer of the conventional DC/DC converter and the load, thereby preventing power loss from occurring due to a current measuring resistor.

Since the present invention does not use the gain/integral controller positioned at the secondary terminal of the conventional DC/DC converter and thus does not use an additional Opto coupler, it is possible to decrease the number of elements.

According to the present invention, there is provided an adapter power supply having high efficiency and high power density by varying a link voltage of a DC power serving as an input power of a DC/DC converter according to variation of a load current estimated by measuring a primary current by using a lossless current measuring method at a primary terminal of a transformer and thus presuming the load current of an output power.

The present invention is not limitative to the above-described embodiment and the accompanying drawings, but is limitative to the appended claims. It will be appreciated by those skilled in the art that changes may be made in these embodiments without departing from the principles and spirit of the general inventive concept, the scope of which is defined in the appended claims and their equivalents.

What is claimed is:

1. An adapter power supply, comprising:
   an AC/DC converter for converting an AC power into a DC power;
   a DC/DC converter including a transformer having a primary terminal and a secondary terminal for converting a link voltage of the DC power into an output power; and
   a controller for estimating a load current of the output power through a primary current of the transformer and varying the link voltage of the DC power according to variation of the estimated load current,
   wherein the controller includes:
   a first coupler for outputting a difference between an output voltage of the output power and a reference output voltage;
   a gain controller connected to the first coupler;
   an Opto coupler connected to the gain controller;
   a current sensor for sensing the primary current;
   a variation controller connected to the current sensor for outputting an output voltage control signal and a link voltage control signal;
   a second coupler for coupling a control signal passing the Opto coupler with the output voltage control signal;
   an integral controller connected to the second coupler;
   a frequency modulator connected to the integral controller for controlling switching of the DC/DC converter;
   a third coupler for coupling the link voltage control signal with a difference between the link voltage of the DC power and a reference link voltage;
   a gain/integral controller connected to the third coupler; and
   a pulse width modulator connected to the gain/integral controller for controlling switching of the AC/DC converter.

2. The adapter power supply according to claim 1, wherein the AC/DC converter includes:
   a filter for removing electro-magnetic interference of the AC power;
   a rectifier for rectifying and smoothing the filtered AC power passing the filter; and
   a power factor compensator for compensating for a power factor of the rectified power passing the rectifier and outputting the DC power.

3. The adapter power supply according to claim 1, wherein the DC/DC converter is an LLC (Logical Link Control) resonant converter.

4. The adapter power supply according to claim 1, wherein the current sensor is configured to sense the primary current of the transformer through voltage ripple measurement of a resonant capacitor in which a voltage is varied by integrating a current of a resonant inductor at the primary terminal of the transformer.

5. The adapter power supply according to claim 1, wherein the current sensor is configured to sense the primary current of the transformer by a current distributing method using a part of a current inputted into a resonant capacitor at the primary terminal of the transformer.

6. The adapter power supply according to claim 1, wherein the current sensor comprises an auxiliary winding added to a resonant inductor at the primary terminal of the transformer for sensing the primary current of the transformer.

7. The adapter power supply according to claim 3, wherein the AC/DC converter is a boost converter.

* * * * *